(12) United States Patent
Hu (10) Patent No.: US 7,477,304 B2
(45) Date of Patent: Jan. 13, 2009

(54) TWO NARROW BAND AND ONE WIDE BAND COLOR FILTER FOR INCREASING COLOR IMAGE SENSOR SENSITIVITY

(75) Inventor: Shane Ching-Feng Hu, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 655 days.

(21) Appl. No.: 10/926,345

(22) Filed: Aug. 26, 2004

(65) Prior Publication Data

US 2006/0044427 A1    Mar. 2, 2006

(51) Int. Cl.
*H04N 5/335* (2006.01)
(52) U.S. Cl. ........................ 348/272; 348/373
(58) Field of Classification Search ........... 348/266, 348/272, 273, 275, 276, 222.1
See application file for complete search history.

(56) References Cited

U.S. PATENT DOCUMENTS

| | | | |
|---|---|---|---|
| 4,403,247 A | 9/1983 | Sone et al. | |
| 4,760,441 A | 7/1988 | Kohno | |
| 5,018,006 A * | 5/1991 | Hashimoto | 348/275 |
| 5,668,596 A * | 9/1997 | Vogel | 348/222.1 |
| 5,991,045 A | 11/1999 | Lee | |
| 6,674,492 B1 | 1/2004 | Kogame et al. | |
| 6,737,800 B1 | 5/2004 | Winters et al. | |
| 2004/0042653 A1 | 3/2004 | Hu | |
| 2004/0105021 A1 | 6/2004 | Hu | |
| 2007/0076113 A1 * | 4/2007 | Tamaru et al. | 348/333.01 |

OTHER PUBLICATIONS

Sabine Susstrunk et al., "Standard RGB Color Spaces", IS&T/SID Seventh Color Imaging Conf., Nov. 1999, p. 127-134, Scottsdale, AZ.

C.A. Bouman, "Digital Color Imaging", Jul. 23, 2004, p. 1-28 available at http://dynamo.ecn.purdue.edu/~bouman/ee637/notes/pdf/ColorSpaces.pdf.

Dan Su et al., "Demosaicing of Colour Images Using Pixel Level Data-Dependent Triangulation", Proceedings of the Theory and Practice of Computer Graphics (2003), IEEE.

* cited by examiner

*Primary Examiner*—Tuan V Ho
(74) *Attorney, Agent, or Firm*—Dickstein Shapiro LLP (57) ABSTRACT

A color filter to increase the low light sensitivity of an image sensor. The color filter has two narrow band color filters and one wide band filter. Also disclosed is a unique way of processing a tri-stimulus signal to dynamically adjust color contrast depending on the illumination conditions.

22 Claims, 6 Drawing Sheets

TWO NARROW BAND AND ONE WIDE BAND COLOR FILTER FOR INCREASING COLOR IMAGE SENSOR SENSITIVITY

FIELD OF THE INVENTION

The present invention relates to the field of imaging devices, and in particular, to the use of color filters in connection with imaging devices.

BACKGROUND OF THE INVENTION

Image sensors are sensitive to light in the visible spectrum. Naturally, however, the image sensors used in digital imaging are essentially black and white (light and dark) images. To capture color images, multiple band-pass color filters are imposed in front of the image sensor cells over the photosensitive areas of the cells. Color filters are typically pigmented or dyed material that will only pass a narrow band of visible light, e.g., red, blue, or green. For most low cost CMOS or CCD image sensors, the color filters are integrated with the sensor cells. A common example of a color filter pattern is the tiled color filter array illustrated in U.S. Pat. No. 3,971,065, and commonly referred to as "the Bayer pattern" color filter. The color filters allow what would otherwise be black and white image sensors to produce color images.

Figure 1:
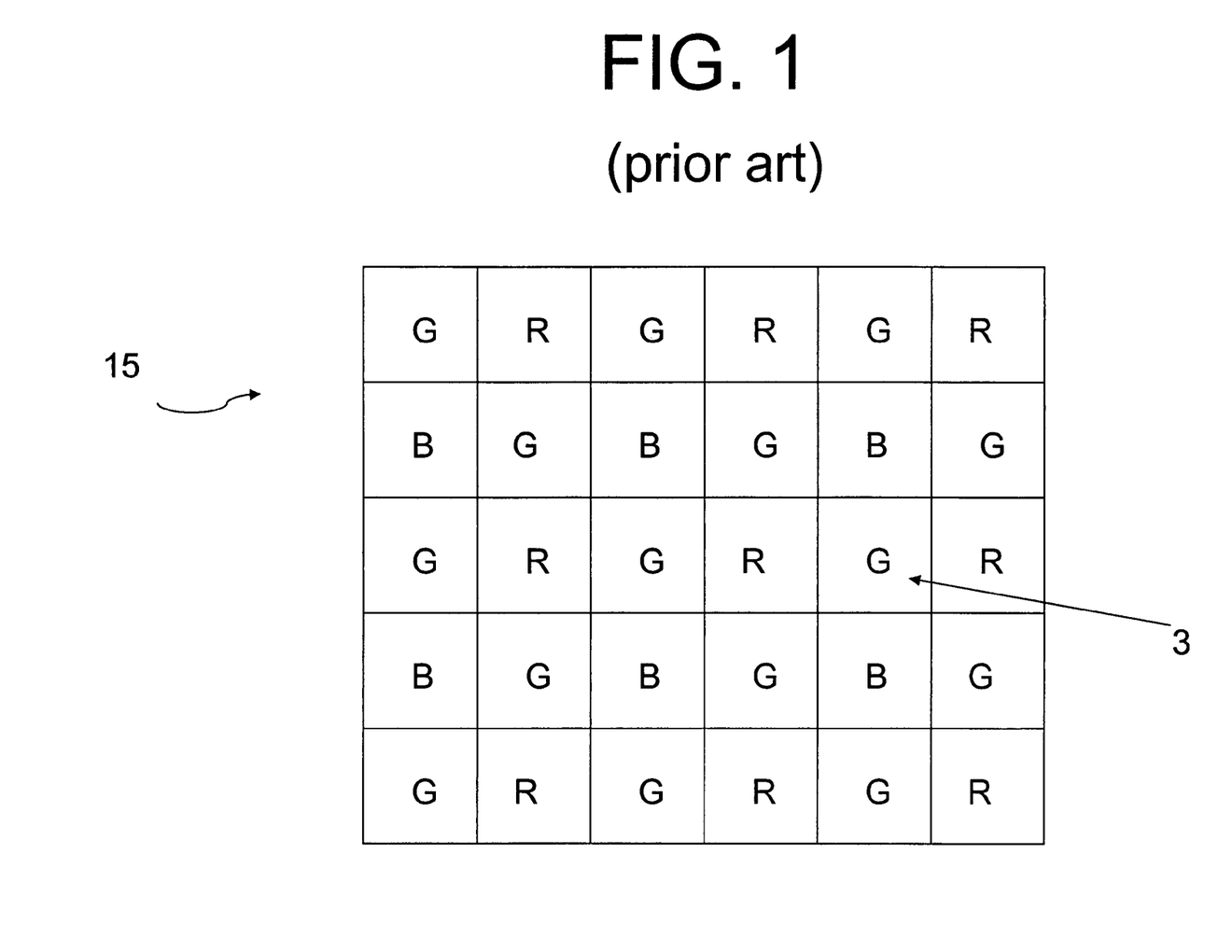
FIG. 1 is a top-down illustration of a conventional color filter array.

As shown in FIG. 1, the Bayer pattern 15 is an array of repeating red (R), green (G), and blue (B) filters. Half of the filters in the Bayer pattern 15 are green, while one quarter are red and the other quarter are blue. As shown, the pattern 15 repeats a row of alternating red and green color filters followed by a row of alternating blue and green filters. The Bayer patterned filters may be deposited on top of an array 20 of pixel sensor cells 22 in the manner shown in FIG. 2. Specifically, an array 20 of pixel sensor cells 22 is formed in a semiconductor substrate 10. Each of the pixel sensor cells 22 has a photosensitive element 12, which may be any photon-to-charge converting device, such as a photogate, photoconductor or photodiode. The color filter array 25 is typically formed over a metal layer 18 in the array 20, separated from the photosensor 12 by insulating layers like an interlevel dielectric layer (ILD) 14 and a passivation layer 16. The metal layer 18 may be opaque and used to shield the area of the pixels that is not light sensitive. Convex lenses 21 are formed over the color filters 25. Tin operation, incident light is focused by the lenses through the filters 25 to the photosensitive element 12.

The first step in color processing, when a conventional Bayer patterned color filter 15 is utilized, is typically called an interpolation. Since each pixel sensor cell is only producing a signal indicative of one color, interpolation from the neighboring pixel signals is used to produce a value for the other two colors for that pixel. For example, with reference to FIG. 1, the pixel sensor cell corresponding to the green filter 3, produces only a signal representing green light. In order to obtain an approximation of the amount of red and blue light for this pixel sensor cell, a value is interpolated from the neighboring red pixel cells (left and right) and the neighboring blue pixel cells (above and below), respectively. Further processing is then performed on the signals to correct the signals to make the produced image closer to the observed image as seen by the human eye.

As long as the color in the image that is being captured changes slowly relative to the filter pattern, color interpolation works well. However, for the edges of observed objects, or for very fine details, color may be interpolated incorrectly and artifacts can result. For example, a small white dot in a scene might illuminate only a single blue pixel. The white dot might come out blue if it is surrounded by black or some other color, depending on what comes out of the interpolation. This effect is called aliasing. One way to reduce aliasing is to use a blurring (or "anti-aliasing") filter, which deliberately discards fine details. Defocussing the camera lens does almost the same thing. However, these are not always desirable alternatives.

As image sensors become increasingly smaller due to desired scaling, low light sensitivity becomes a very challenging problem. The conventional Bayer color filters are all narrow band-pass in nature, as none of them capture the whole visible spectrum. In low light conditions, this deficiency is even more apparent. One approach to increasing the sensitivity of a pixel sensor cell is to increase its photosensitive area. As customer demands increasingly require smaller devices, this approach is undesirable.

Accordingly, there is a need for a color filter array for use with image sensors that increases the low light sensitivity of the image sensor without increasing the sensing area of the image sensor. There is also a need for a method of processing the improved signals from such a filtered sensor.

BRIEF SUMMARY OF THE INVENTION

Exemplary embodiments of the invention provide a color filter that increases the low light sensitivity of an image sensor without increasing the photosensitive area of the image sensor cell. The inventive color filter has two narrow band color filters and one wide band filter. A unique method of processing the tri-stimulus signals to dynamically adjust color contrast depending on the illumination conditions is also disclosed.

In accordance with one exemplary embodiment, the color filter array has red, blue, and transparent filters. The transparent filter covers the whole visible spectrum such that the underlying image sensor cell is biased toward very high sensitivity in the luminance signal.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

The term "substrate" is to be understood as a semiconductor-based material including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "substrate" in the following description, previous process steps may have been utilized to form regions or junctions in the base semiconductor structure or foundation. In addition, the semiconductor need not be silicon-based, but could be based on silicon-germanium, germanium, or gallium arsenide.

The term "pixel" refers to a picture element unit cell containing a photosensor and transistors for converting light radiation to an electrical signal. For purposes of illustration, a representative pixel is illustrated in the figures and description herein and, typically, fabrication of all pixels in an imager will proceed simultaneously in a similar fashion.

Figure 3:
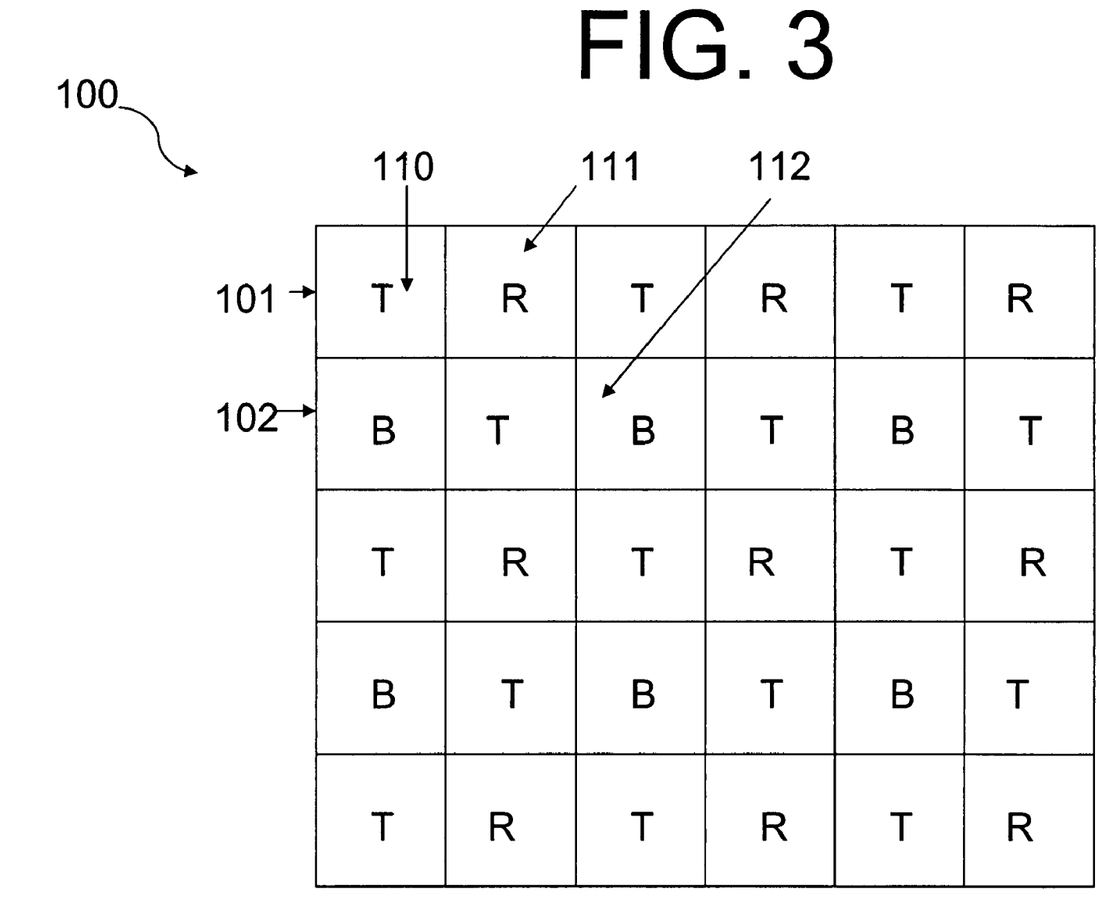
FIG. 3 is a top-down illustration of a color filter array constructed in accordance with an exemplary embodiment of the invention.

Referring now to the drawings, where like elements are designated by like reference numerals, FIG. 3 illustrates a top down view of an exemplary color filter array 100 constructed in accordance with the invention. Color filter array 100 has alternating rows 101, 102 of transparent 110 and red 111 color filters (row 101) followed by blue 112 and transparent 110 color filters (row 102). The red 111 and blue 112 filters are narrow band pass filters by in nature, meaning they allow only light having a narrow range of wavelengths, corresponding respectively to the red and blue color ranges, to pass through the filter. The transparent filter 110 is a wide band pass color filter, meaning this filter 110 allows light having any wavelength within the visible spectrum (approximately λ=400 to approximately 700 nm) to pass through the filter 110 and be sensed by an underlying pixel sensor cell.

Figure 2:
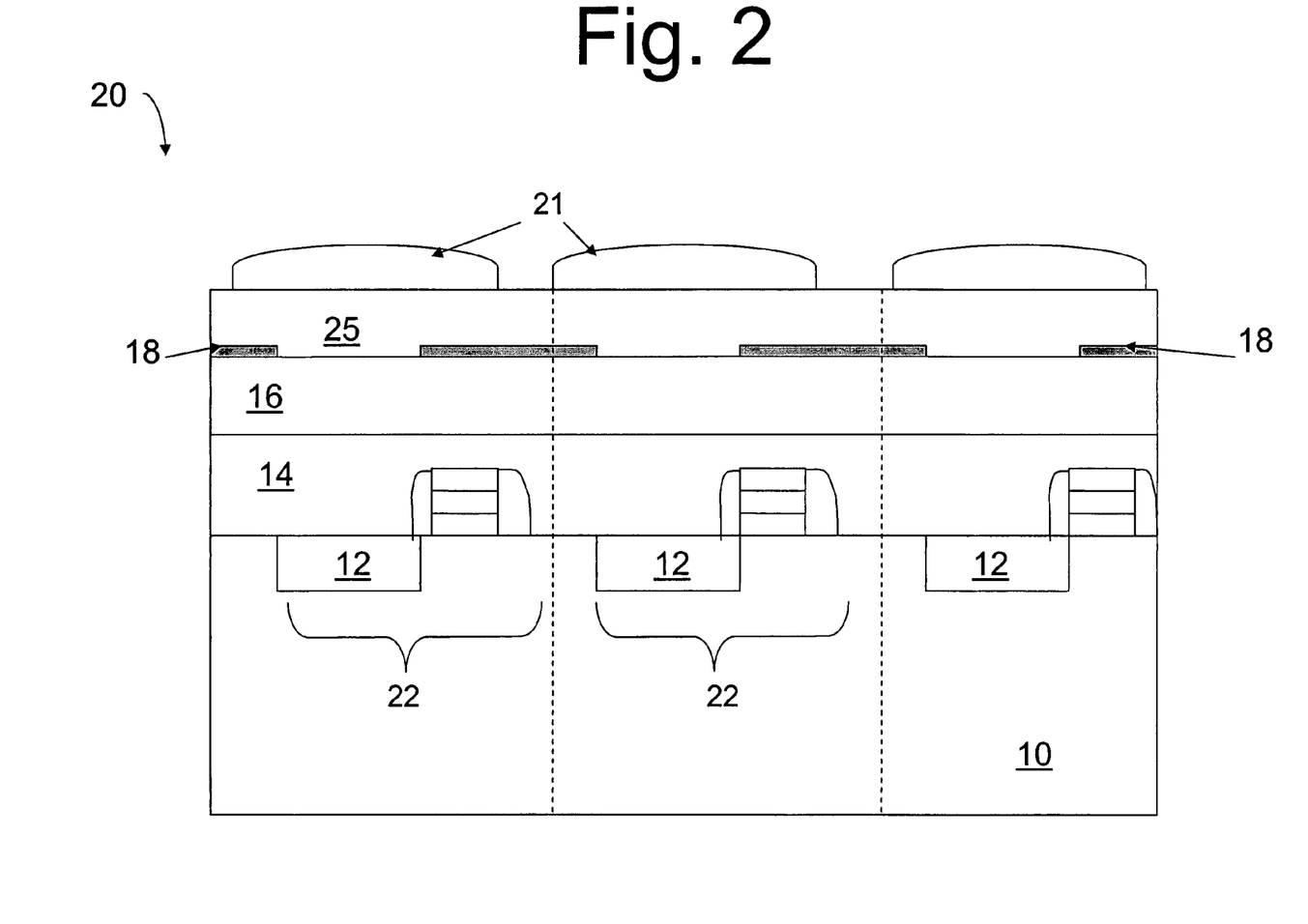
FIG. 2 is a cross-sectional view of a portion of a pixel array having a color filter array.

It should be understood that the inventive color filter array 100 may be utilized in connection with a pixel array just as a conventional color filter would, as shown in FIG. 2. Thus, each red filter 111 corresponds to a single underlying pixel sensor cell 22, that creates a signal corresponding to the amount of red light received in the photosensitive area 12 of the pixel. Similarly, each transparent filter 110 has an underlying pixel sensor cell 22 that produces a signal representing the entire spectrum of visible light sensed by the pixel, and each blue filter 112 has an underlying pixel sensor cell 22 that produces a signal representing the amount of blue light sensed by the pixel. Because the inventive filter array 100 covers the entire spectrum of visible light, an imager device 1008 (FIG. 5) employing the color filter array 100 has increased sensitivity without an increase in photosensitive area. In addition, other devices, such as Infrared and Ultraviolet light filters (not shown) may be used in conjunction with the filter array 100 between the lenses 21 and the filter array 100.

Figure 4:
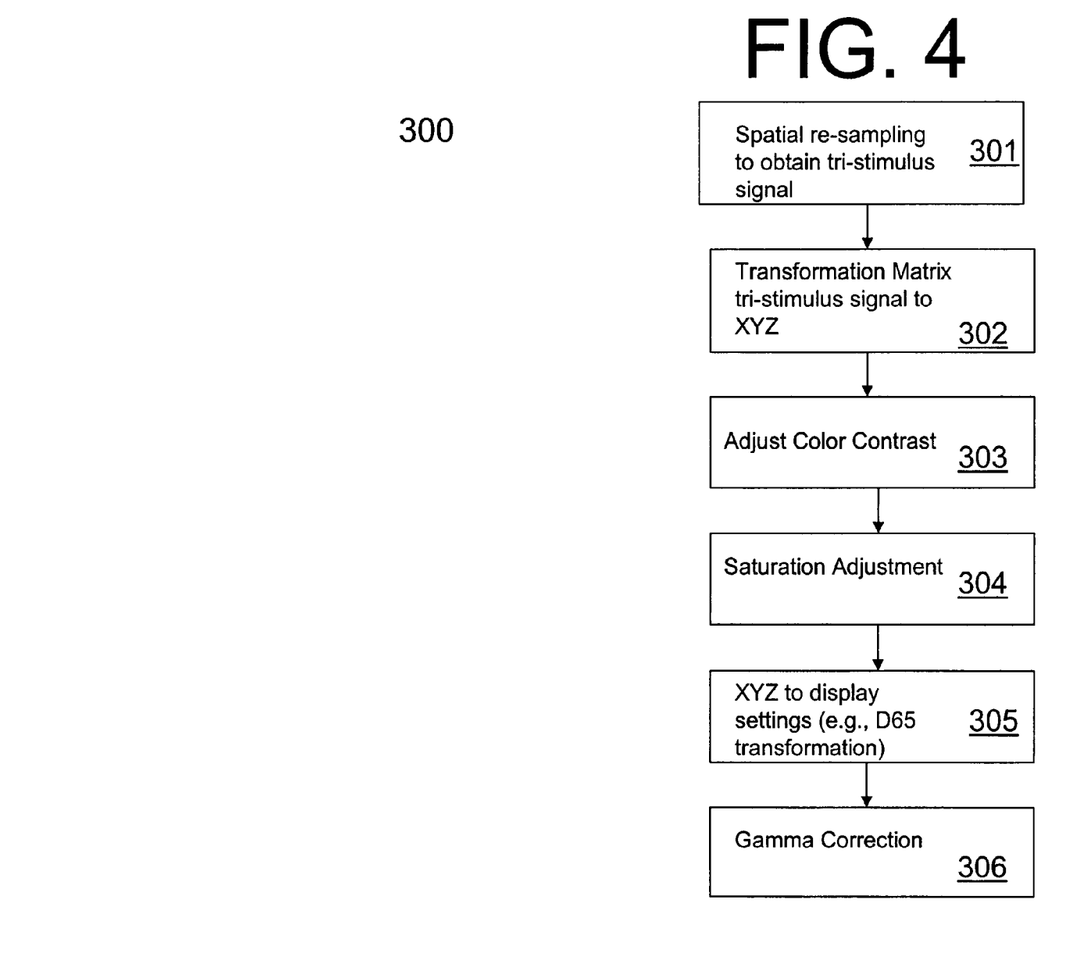
FIG. 4 is a flow chart illustrating exemplary color processing steps in accordance with the invention.

With reference to FIG. 4, the following description relates to an exemplary color transformation processing method 300 performed on the signals obtained from a pixel sensor array, such as pixel array 20 of FIG. 2, utilizing the color filter array 100 of the invention. It should be noted that it is assumed that the exposure control for an imaging device 1008 (FIG. 5) having a pixel array 200 using the color filter array 100 of the invention is done separately and does not impact the color processing steps.

The first step is an interpolation step that obtains a tri-stimulus, or three color sample, signal. This step is performed for each pixel sensor cell that naturally produces one color signal to interpolate from adjacent pixels the two color signals not created by the pixel. The interpolation involves mathematically equating the color signals from neighboring pixel sensor cells to approximate a signal for the amount of light received at the pixel for the other two colors of light. Thus, a signal is generated at step 301 that is an "RMB" tri-stimulus signal (where R=red value, M=transparent value, and B=blue value).

Next, at step 302, an RMB to XYZ transformation is performed. The transformation can be explained mathematically using a matrix [T] as shown below. The matrix [T] is sensor and lens dependent. The matrix can be loaded into the processor as part of an external interface:

$$\begin{vmatrix} X \\ Y \\ Z \end{vmatrix} = \begin{vmatrix} T\_00 & T\_01 & T\_02 \\ T\_10 & T\_11 & T\_12 \\ T\_20 & T\_21 & T\_22 \end{vmatrix} * \begin{vmatrix} R \\ M \\ B \end{vmatrix}$$

Next, at step 303, a dynamic color contrast adjustment is made, depending on the illumination condition of the surroundings. SaturationR and saturationB are externally settable parameters for nominal operation of the imager 1008. SaturationR and saturationB are further adjusted depending on the scene illumination. In particular, under low illumination condition, it is desirable to reduce the color saturation, e.g., inversely proportional to the illumination, to reduce the noise. Thus, under low illumination conditions, the parameters saturationR and saturationB will be reduced. For most imagers, an amplifier to boost the image output is employed. For nominal lighting conditions, the amplifier is operating at or below unity gain setting. For very low light condition, the gain of the amplifier is greater than unity. In this disclosure, the sensor gain setting is used as an indication of illumination.

The reduction_factor can be determined by the following formulas:

$$\text{gain\_factor} = (\text{max\_gain} - \text{current\_gain})/(\text{max\_gain} - \text{nominal\_gain}); \quad (1)$$

$$\text{reduction\_factor} = \text{maxReduction} * (1.0 - \text{gain\_factor}). \quad (2)$$

In this way, the imager 1008 (FIG. 5) can reduce the color contrast under low illumination conditions. New values for saturationR and saturationB are now calculated which will be used in the further processing of the color image. The new values are calculated according to the following equations:

$$\text{saturation}R = \text{saturation}R * (1.0 - \text{reduction\_factor}); \quad (1)$$

and $$\text{saturation}B = \text{saturation}B * (1.0 - \text{reduction\_factor}). \quad (2)$$

Next, at step 304 a saturation adjustment is performed. This step is essential when utilizing a color filter array 100 with a transparent color filter 110 because the image produced by the tri-stimulus signal at step 302 (once mapped to XYZ space) is pastel, and must be stretched out to obtain a colorful image. The saturation adjustment step 304 is done according to the following equations:

$$X = (X - Y) * \text{saturation}R + Y; \quad (3)$$

$$Y = Y; \quad (4)$$

and $$Z = (Z - Y) * \text{saturation}B + Y. \quad (5)$$

where saturationR and saturationB are variables determined and preset to adjust the contrast of the images produced, and where Y is the luminance. This step 304, dynamically adjusts the color contrast for the image to be produced depending on the illumination conditions of the captured image.

Next, a color space transformation is performed to convert the tri-stimulus signal to signals for use by external interfaces. The external interfaces may be any form for displaying a digital image, including but not limited to a camera display, computer monitor, and a printer. Therefore, depending on the type of external interface, an inverse of the power function of the interface is performed in order to convert the linear response signals (X,Y,Z) to that which would be reproduced by the display. Thus, at step 305, an XYZ to computer monitor display transformation step is performed. The transformation may be done, for example, by using the known D65 monitor transformation matrix according to:

$$\begin{vmatrix} R \\ G \\ B \end{vmatrix} = \begin{vmatrix} 2.741190 & -1.142934 & -0.424567 \\ -1.083142 & 1.9978990 & 0.0289980 \\ 0.1168400 & -0.320317 & 1.1103770 \end{vmatrix} * \begin{vmatrix} X \\ Y \\ Z \end{vmatrix}$$

It should be understood that other transformations could be done at this step as well, and the known D65 monitor transformation is being described for exemplary purposes only. The desired transformation performed at step 305 is dependent on the type and make of the external display device used with the imaging device of this invention.

Finally, at step 306, a gamma correction step is performed to account for the non-linear light generated by the display device. This gamma correction 306 may be done, for example, utilizing known look up tables. Gamma-corrected coding allows the use, at other stages in the processing method 300, of an 8-bit digital signal.

Figure 5:
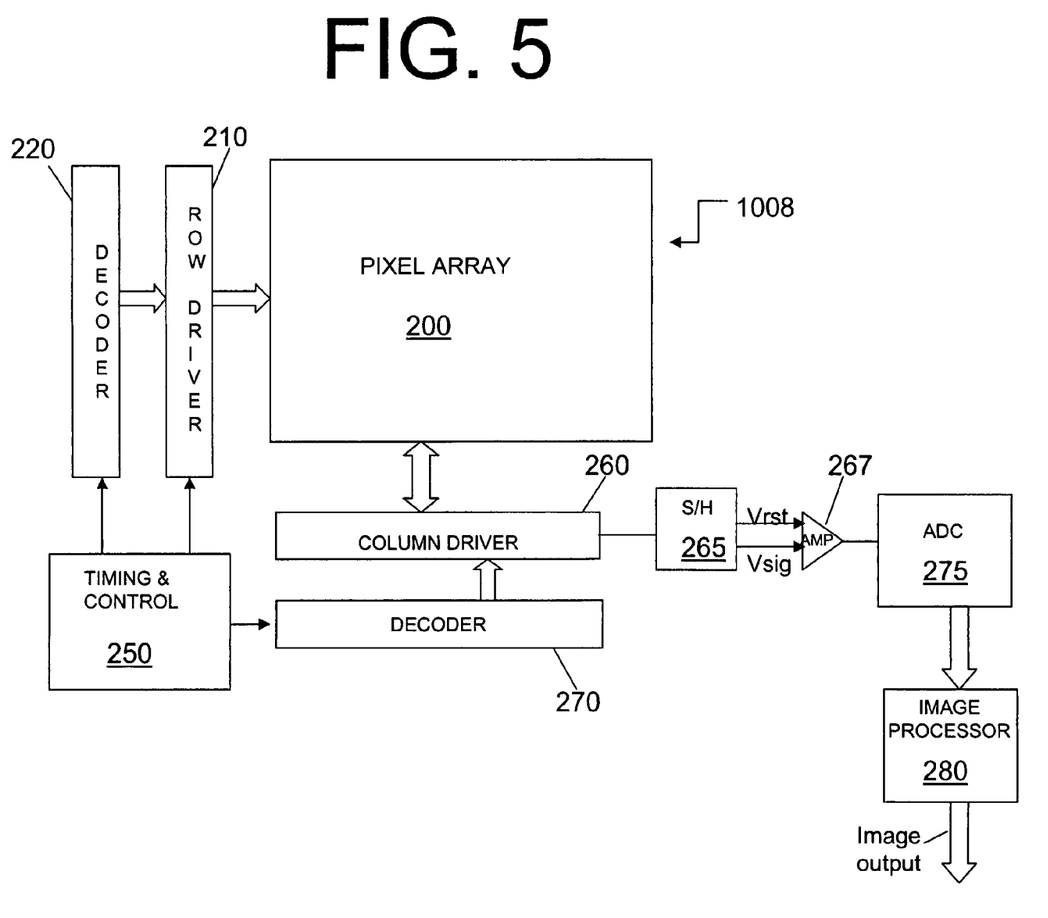
FIG. 5 is a block diagram of CMOS imager having a array of pixel sensor cells in accordance with the invention.

FIG. 5 illustrates a block diagram of a CMOS imager device 1008 having a pixel array 200 containing the color filter array 100 as described above. Pixel array 200 comprises a plurality of pixels sensor cells having a color filter 100 arranged in a predetermined number of columns and rows (not shown). The pixels of each row in array 200 are all turned on at the same time by a row select line, and the pixels of each column are selectively output by respective column select lines. A plurality of row and column lines are provided for the entire array 200. The row lines are selectively activated in sequence by a row driver 210 in response to row address decoder 220. The column select lines are selectively activated in sequence for each row activation by a column driver 260 in response to column address decoder 270. Thus, a row and column address is provided for each pixel.

The CMOS imager 1008 is operated by a control circuit 250, which controls address decoders 220, 270 for selecting the appropriate row and column lines for pixel readout. Control circuit 250 also controls the row and column driver circuitry 210, 260 so that they apply driving voltages to the drive transistors of the selected row and column lines. The pixel output signals typically include a pixel reset signal $V_{rst}$ taken off of a floating diffusion region when it is reset by the reset transistor and a pixel image signal $V_{sig}$, which is taken off the floating diffusion region after photo-generated charges are transferred to it. The $V_{rst}$ and $V_{sig}$ signals are read by a sample and hold circuit 265 and are subtracted by a differential amplifier 267, to produce a differential signal $V_{rst}-V_{sig}$ for each pixel. $V_{rst}-V_{sig}$ represents the amount of light impinging on the pixels. This difference signal is digitized by an analog-to-digital converter 275. The digitized pixel signals are fed to an image processor 280 to form a digital image output. The digitizing and image processing can be located on or off the imager chip. In some arrangements the differential signal $V_{rst}-V_{sig}$ can be amplified as a differential signal and directly digitized by a differential analog to digital converter. The image processor 280 will typically perform the process flow described above with respect to FIG. 4.

Figure 6:
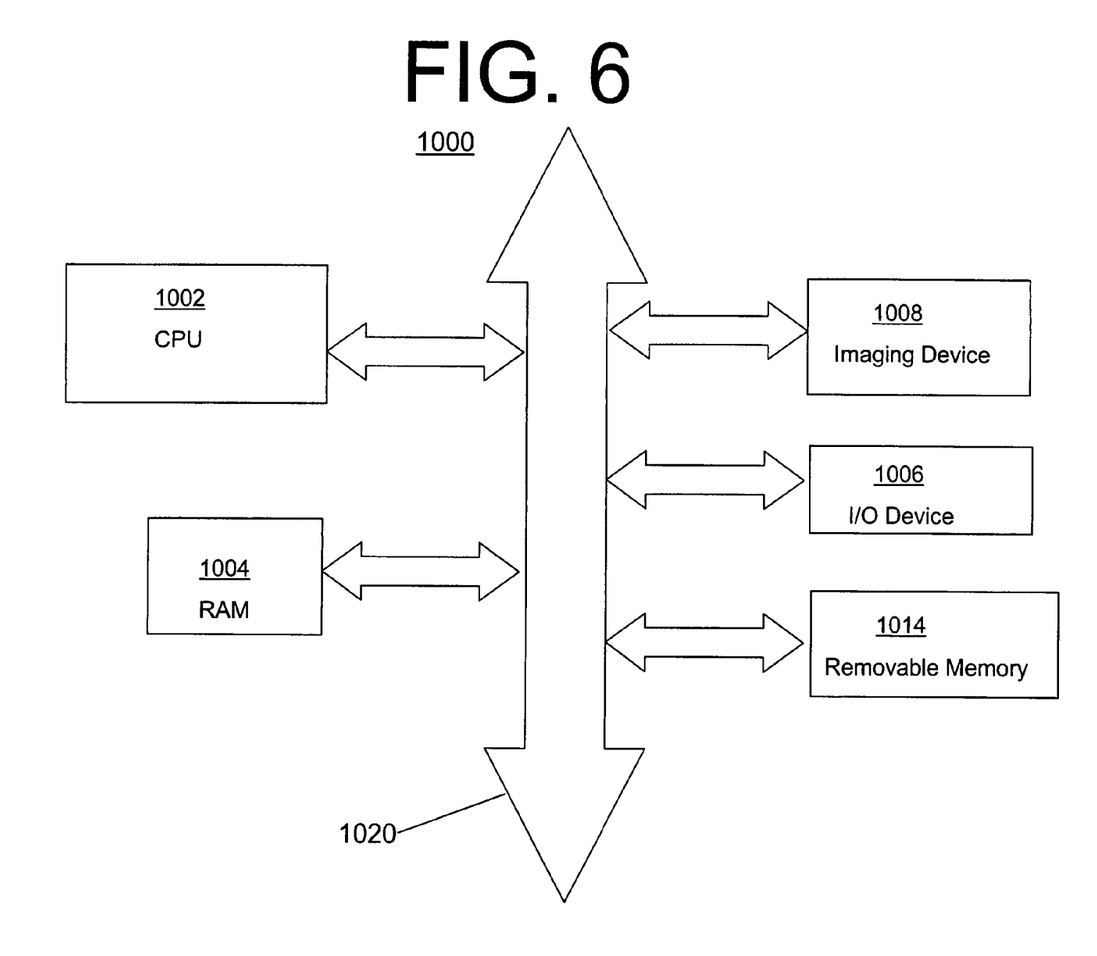
FIG. 6 is a block diagram of a processor system incorporating at least one imager device constructed in accordance with an embodiment of the invention.

FIG. 6 shows a system 1000, a typical processor system modified to include an imaging device 1008 (FIG. 5) of the invention. The processor system 1000 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, an image stabilization system.

System 1000, for example a camera system, generally comprises a central processing unit (CPU) 1002, such as a microprocessor, that communicates with an input/output (I/O) device 1006 over a bus 1020. Imaging device 1008 also communicates with the CPU 1002 over the bus 1020. The processor-based system 1000 also includes random access memory (RAM) 1004, and can include removable memory 1014, such as flash memory, which also communicates with the CPU 1002 over the bus 1020. The imaging device 1008 may be combined with a processor, such as a CPU, digital signal processor, or microprocessor, with or without memory storage on a single integrated circuit or on a different chip than the processor.

It should be understood that other methods of processing the color signals produced from a device using color filter 100 are within the scope of the invention, and that the invention is in no way limited to the sequence of steps or the standards of color processing as described herein. As such, the above description and drawings are only to be considered illustrative of exemplary embodiments which achieve the features and advantages of the invention. Modification of, and substitutions to, specific process conditions and structures can be made without departing from the spirit and scope of the invention. Accordingly, the invention is not to be considered as being limited by the foregoing description and drawings, but is only limited by the scope of the appended claims.

What is claimed as new and desired to be protected by Letters Patent of the United States is:

1. An imaging device comprising:
   a plurality of imager pixel cells for capturing an image, each cell comprising a photosensor and generating a pixel signal based on light from one of a transparent filter, a red filter, or a blue filter;
   a color filter array formed over the plurality of cells, said array comprising alternating rows of a first and second type, wherein the first type of rows comprises said transparent and red color filters respectively formed over the cells and the second type of rows comprises said transparent and blue color filters respectively formed over the cells; and
   a processor for adjusting a color contrast of the image based on a readout of the cells formed under the transparent filters, said processor configured to
   generate an interpolated signal for each cell based on its respective pixel signal and said pixel signals of its neighboring cells,
   perform a lens dependent matrix transformation of each interpolated signal, each of said transformed signals having a luminance component determined from at least one of said pixel signals based on light from at least one of said transparent filters; and individually modify, for each of said transformed signals, a preset color contrast adjustment based on said respective luminance component.

2. The imaging device of claim 1, further comprising at least one of an infrared or a ultraviolet filter formed over the plurality of imager pixel cells.

3. The imaging device of claim 2, further comprising a light shield layer formed above the dielectric layer but below the color filter array, for shielding areas of said pixel cells from light exposure.

4. The imaging device of claim 1, wherein the imager pixel cells comprise CMOS imager pixel cells.

5. The imaging device of claim 1, wherein the first type of row comprises alternating transparent and red color filters.

6. The imaging device of claim 1, wherein the second type of row comprises alternating transparent and blue color filters.

7. A color imaging device comprising:
an array of image pixel sensors for forming an image, comprising:
a plurality of a first type of image sensors that produce a first pixel signal indicative of an amount of incident light having wavelengths within a first narrow band of color;
a plurality of a second type of image sensors that produce a second pixel signal indicative of an amount of incident light having wavelengths within a second narrow band of color;
a plurality of a third type of image sensors that produce a third pixel signal indicative of an amount of incident light having wavelengths within the whole visible spectrum; and
a processor for adjusting a color contrast of the image based on a readout of the third type of image sensors, said processor configured to
generate an interpolated signal for each of said image pixel sensors based on its respective pixel signal and said pixel signals of its neighboring cells,
perform a lens dependent matrix transformation of each interpolated signal, each of said transformed signals having a luminance component determined from at least one said third pixel signals, and
individually modify, for each of said transformed signals, a preset color contrast adjustment based on said respective luminance component.

8. The color imaging device of claim 7, wherein the first narrow band of color and the second narrow band of color correspond to primary colors.

9. The color imaging device of claim 8, wherein one of the first and second narrow bands of color corresponds to red.

10. The color imaging device of claim 8, wherein one of the first and second narrow bands of color corresponds to blue.

11. The color imaging device of claim 8, wherein the image sensors are arranged in an array having alternating rows of first and third image sensor types with rows of second and third image sensor types.

12. A processing system comprising: an imaging device comprising:
a color filter array having a plurality of red, blue and transparent color filters;
an array of image sensors located below the filter array, each sensor corresponding to one of the red, blue and transparent color filters and for producing a pixel signal representing an amount of light received at the sensor; and a processor for processing said signals to produce an image captured by the image sensors and for adjusting a color contrast of the image based on readout of the sensors corresponding to the transparent filters, said processor configured to
generate an interpolated signal for each image sensor based on its respective pixel signal and said pixel signals of its neighboring cells,
perform a lens dependent matrix transformation of each interpolated signal, each of said transformed signals having a luminance component based on said light from at least one of said transparent color filters, and
individually modify, for each of said transformed signals, a preset color contrast adjustment based on said respective luminance component.

13. The processing system of claim 12, wherein the color filter array comprises:
a plurality of a first type of rows comprising alternating transparent and red color filters; and
a plurality of a second type of rows comprising alternating transparent and blue color filters, wherein the rows form a pattern of alternating first and second type of rows.

14. The processing system of claim 12, wherein the image sensors are CMOS pixel sensor cells.

15. A method of processing a digital color signal comprising the acts of:
obtaining a pixel signal from each of a plurality of image sensors including first, second, and third image sensors corresponding to applied light with wavelengths in one of the red, blue and whole visible light spectrum, respectively;
producing a tri-stimulus signal for each image sensor based on its respective pixel signal and said pixel signals of its neighboring image sensors;
performing a lens dependent matrix transformation of each tri-stimulus signal, each of said transformed signals having a luminance component determined from at least one pixel signal generated by at least one of said third image sensors; and
individually modifying, for each of said transformed signals, a preset color contrast adjustment based on said respective luminance component.

16. The method of claim 15, wherein the step of producing a tri-stimulus signal comprises interpolation based on the signal obtained from adjacent image sensors.

17. The method of claim 15, further comprising the step of filtering the ultraviolet and infrared light.

18. The method of claim 15, wherein the external interface comprises any one of a computer monitor, a camera screen and a printer output.

19. A method of processing a digital color signal comprising the acts of:
obtaining a signal from each of a plurality of image sensors including first, second, and third image sensors corresponding to applied light with wavelengths in one of the red, blue and whole visible light spectrum, respectively;
producing a tri-stimulus signal for each signal obtained;
processing the tri-stimulus signal in order to reproduce the image including
transforming the tri-stimulus signal for each pixel to XYZ space,
performing a saturation adjustment, and
transforming the signal for compatibility with an external interface; and
adjusting a color contrast of the image based on a readout of the third image sensors.

20. The method of claim 19, wherein said step of transforming the signal for compatibility comprises a D65 matrix transformation.

21. The method of claim 19, wherein the step of dynamically adjusting the color contrast comprises the steps of:

externally setting at least one contrast parameter to a predetermined value; and and adjusting said at least one contrast parameter to an adjusted level depending on the illumination surrounding the desired image.

22. The method of claim 21, wherein the at least one adjusted contrast parameter is used in the step of performing a saturation adjustment.

* * * * *

UNITED STATES PATENT AND TRADEMARK OFFICE
CERTIFICATE OF CORRECTION

PATENT NO.        : 7,477,304 B2                                              Page 1 of 1
APPLICATION NO.   : 10/926345
DATED             : January 13, 2009
INVENTOR(S)       : Hu It is certified that error appears in the above-identified patent and that said Letters Patent is hereby corrected as shown below:

In column 7, line 2, in Claim 1, delete "filters;" and insert -- filters, --, therefor.

In column 10, line 1, in Claim 21, before "adjusting" delete "and".

Signed and Sealed this

Seventh Day of April, 2009

JOHN DOLL
*Acting Director of the United States Patent and Trademark Office*